United States Patent
Keskitalo et al.

(10) Patent No.: US 12,063,582 B2
(45) Date of Patent: Aug. 13, 2024

(54) ENHANCING COMMUNICATION EFFICIENCY

(71) Applicant: NOKIA TECHNOLOGIES OY, Espoo (FI)

(72) Inventors: Ilkka Antero Keskitalo, Oulu (FI); Esa Tapani Tiirola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 442 days.

(21) Appl. No.: 17/272,769

(22) PCT Filed: Sep. 4, 2018

(86) PCT No.: PCT/EP2018/073741
§ 371 (c)(1),
(2) Date: Mar. 2, 2021

(87) PCT Pub. No.: WO2020/048588
PCT Pub. Date: Mar. 12, 2020

(65) Prior Publication Data
US 2021/0321298 A1    Oct. 14, 2021

(51) Int. Cl.
*H04W 40/12* (2009.01)
*H04W 28/06* (2009.01)
(Continued)

(52) U.S. Cl.
CPC ........... *H04W 40/12* (2013.01); *H04W 28/06* (2013.01); *H04W 28/0967* (2020.05);
(Continued)

(58) Field of Classification Search
CPC . H04W 40/12; H04W 28/06; H04W 28/0967; H04W 36/026; H04W 36/30; H04W 36/36; H04W 84/047
See application file for complete search history.

(56) References Cited

U.S. PATENT DOCUMENTS

2010/0002650 A1* 1/2010 Ahluwalia ............ H04W 36/02
370/331
2011/0080890 A1* 4/2011 Cai .................. H04W 36/0033
455/436
(Continued)

FOREIGN PATENT DOCUMENTS

WO    WO 2018/142308 A1    8/2018
WO    WO 2018/156696 A1    8/2018

OTHER PUBLICATIONS

Huawei et al., R2-1802473, DC based NR scheme for 0ms interruption handover, 3GPP TSG-RAN WG2 #101, Athens, Greece, Feb. 26-Mar. 2, 2018 (Year: 2018).*
(Continued)

*Primary Examiner* — John Pezzlo
*Assistant Examiner* — Yewon Kim
(74) *Attorney, Agent, or Firm* — Barta Jones, PLLC

(57) ABSTRACT

There is provided a method in a device of a cellular network, the method comprising: receiving a user plane data from a source network node of the cellular network; detecting that at least one quality condition with respect to the user plane data transfer is met; and in response to the detecting that the at least one quality condition is met, causing a transmission of an indication for a data forwarding or duplication to a target network node of the cellular network or to the source network node, the data forwarding or duplication causing the source network node to forward or duplicate a user plane data of the device to the target network node.

10 Claims, 8 Drawing Sheets

(51) Int. Cl.
　　　*H04W 28/08*　　(2023.01)
　　　*H04W 36/02*　　(2009.01)
　　　*H04W 36/30*　　(2009.01)
　　　*H04W 36/36*　　(2009.01)
　　　*H04W 84/04*　　(2009.01)

(52) U.S. Cl.
　　　CPC ......... *H04W 36/026* (2013.01); *H04W 36/30* (2013.01); *H04W 36/36* (2013.01); *H04W 84/047* (2013.01)

(56) References Cited

U.S. PATENT DOCUMENTS

| | | | | |
|---|---|---|---|---|
| 2015/0146687 | A1* | 5/2015 | Kim | H04W 36/36 370/331 |
| 2018/0279193 | A1* | 9/2018 | Park | H04W 36/30 |
| 2019/0387440 | A1* | 12/2019 | Yiu | H04W 36/165 |

OTHER PUBLICATIONS

First Examination Report dated Jan. 21, 2022 corresponding to Indian Patent Application No. 202147008921.

International Search Report and Written Opinion dated Apr. 11, 2019 corresponding to International Patent Application No. PCT/EP2018/073741.

Adnan Aijaz: "Packet Duplication in Dual Connectivity Enabled 5G Wireless Networks: Overview and Challenges," ARXIV.Org, Cornell University Library, Apr. 3, 2018, XP080867244.

Huawei et al.: "DC based NR scheme for 0ms interruption handover," 3GPP Draft; R1-1710266, 3GPP TSG-RAN WG2 #99bis, Prague, Czech Republic, Sep. 29, 2017, XP051354816.

Communication pursuant to Article 94(3) EPC dated May 16, 2023 corresponding to European Patent Application No. 18765611.1.

"New SID Proposal: Study on Integrated Access and Backhaul for NR", 3GPP TSG RAN Meeting #78, RP-172290, Agenda Item: 9.3.6, AT&T, Dec. 18-21, 2017, 5 pages.

Office Action received for corresponding Chinese Patent Application No. 201880098932.0, dated Oct. 31, 2023, 8 pages of Office Action and no page of translation available.

Office Action received for corresponding Chinese Patent Application No. 201880098932.0, dated Apr. 20, 2024, 6 pages of Office Action and no page of translation available.

\* cited by examiner

ENHANCING COMMUNICATION EFFICIENCY

TECHNICAL FIELD

The invention relates to communications.

BACKGROUND

In a cellular network, a device may be connected to a source network device and receive user plane data from the source network device. It is possible that the connection to the source network device deteriorates. For example, a new connection to a target network device is needed for reception of user plane data. Therefore, it is beneficial to provide solutions which enhance this transition process.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
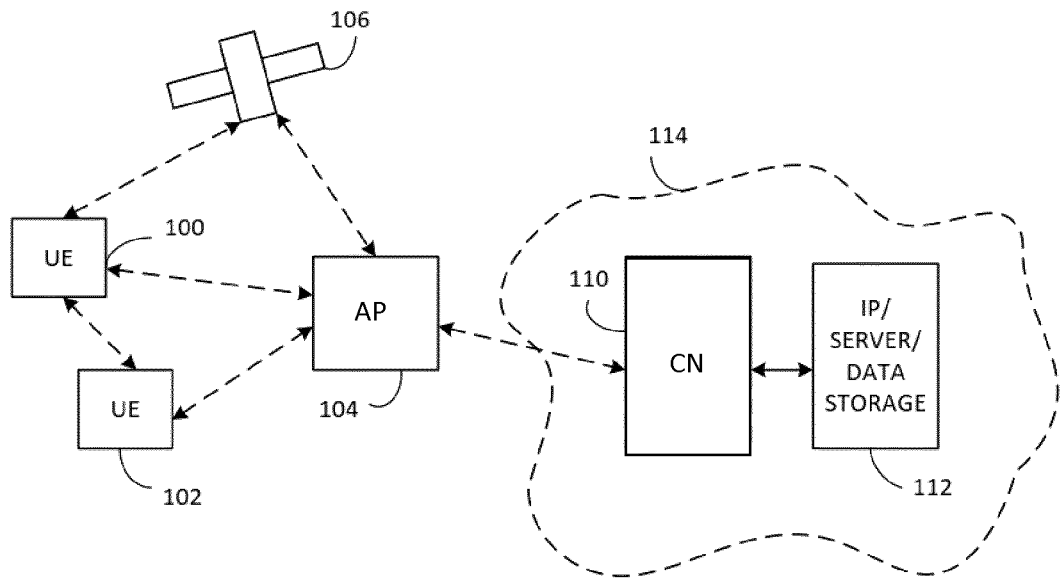
FIG. 1 illustrates an example a wireless communication system to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104 (such as (e/g) NodeB) providing the cell. The physical link from a user device to a (e/g)NodeB is called uplink (UL) or reverse link and the physical link from the (e/g)NodeB to the user device is called downlink or forward link. It should be appreciated that (e/g)NodeBs or their functionalities may be implemented by using any node, host, server or access point etc. entity suitable for such a usage. Said node 104 may be referred to as network node 104 or network element 104 in a broader sense.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a user plane function (UPF) (this may be 5G gateway corresponding to serving gateway (5-GW) of 4G) or access and mobility function (AMF) (this may correspond to mobile management entity (MME) of 4G).

The user device (also called UE, user equipment, user terminal, terminal device, mobile termination, etc.) illustrates one type of an apparatus to which resources on the air interface are allocated and assigned, and thus any feature described herein with a user device may be implemented with a corresponding apparatus, such as a part of a relay node. An example of such a relay node is an integrated access and backhaul (IAB)-node (a.k.a. self-backhauling relay).

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments mobile terminal (MT) part of the relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side and non-real time functions being carried out in a centralized manner.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The 5G NR may need to be able to allow network deployment with minimized manual efforts and as automated self-configuration as possible. Especially on higher frequency bands the coverage may be an issue and specific capabilities may be needed for NR to enable coverage extension with minimized/none requirements for network (re-)planning in a fast and cost-effective manner. Mainly for these reasons NR has the requirement to support wireless backhauling, or self-backhauling, where the NR carrier is used for the backhauling of sites without wired connection and/or fiber connection. A specific relaying node, RN, may be used to provide wireless backhaul connection (instead of having a wired connection) to a ("donor") network node (e.g. donor base station) with fixed connection to the network backhaul, or, to another RN. The serving node(s) may have the overall control of the usage of the radio resources. Further, the half-duplex constraint on unpaired bands is beneficial to be considered which may cause additional restrictions to the radio resource utilization. Self-backhauling in the context of 5G NR may be referred to as Integrated Access and Backhaul (IAB). Hence, the RNs may be IAB nodes in the context of the presented solution. However, such terms may change as technology advances and therefore the proposed solution may need to be understood in a broader sense.

The relaying approach may refer to either in-band or out-band backhauling. The former one shares the same carrier and radio resources for the access and backhaul (BH) links. The latter one separates the carriers for access and backhaul and therefore the operation on the BH link can be a subset of in-band self-backhauling. The proposed solution may be applicable in both cases and can therefore be considered as a generic solution for any wireless relaying options.

Current IAB study is focusing on stationary installation of the IAB nodes. Despite this, the BH links may have to be switched to another serving node as the BH connection may, similarly to access connections, suffer from blockage or otherwise degradation of the radio conditions. For example, a vehicle may be driven between a network device (e.g. UE or another RN) and a RN which provides a service to the network device. Hence, the link used to provide the service may deteriorate (i.e. the vehicle blocks the link). Nonetheless, the RNs, such as IAB nodes, may be stationary or mobile RNs. In case of mobile RNs, the proposed solution may become even more relevant.

The proposed solution relates to ways how the BH change could be fast enough to minimize the connection break and impact on the end user connection quality.

Despite being a wireless connection, the IAB BH link may need to be both reliable and provide sufficient capacity to serve all UEs beyond the subtending topology and BH links. The required capacity may be provided by using mmWave bands, e.g. 28 GHz or 39 GHz, with large carrier bandwidths although the IAB solution may be able to utilize efficiently available radio resources. Another specific requirement for the IAB may be to enable multi-hop operation where an IAB node may serve also another BH link to the following IAB node, i.e. the next hop BH link. Furthermore, the resulted topology may be a tree or a mesh-type where multiple connections may exist to upstream serving nodes.

Wireless backhauling may need be able to react fast to any deterioration of the BH link as this may affect the service quality of the access UEs in the cells served by an IAB node as well as the connection over a potential next hop BH link, in case of multi-hop deployment. The IAB node may be configured to be connected to the best possible cell (served by the donor or an upstream IAB node) to maintain the BH connection. The best possible cell may refer to best quality of service or highest data throughput, for example. Furthermore, the change of the BH connection may need to be fast enough, preferably faster than the mobility, i.e. handover (HO), procedure of the access UEs. When changing the BH link to a new serving node, both the establishment of the radio connection as well as the user plane data path switch may need to be quick to minimize the break in the BH data connection.

Majority of the HO failures are caused by the failed transmission of the measurements report and the HO command. To reduce such failures, so called conditional HO (CHO) may be utilized where the first mobility event is defined to trigger when the connection is still running and another event to trigger the actual HO execution. Triggered by the first event, the UE sends a measurement report and the serving node sends a (C)HO command. The UE reaction to CHO command is just that it starts to wait the second event to initiate access to the target cell. CHO procedure is one specific example where the proposed solution may be applied.

3GPP has specified latency reductions enhancements for LTE including features to minimize the latencies during HO:
 Random Access Channel (RACH)-less operation; RACH procedure can be skipped if certain conditions are fulfilled and the network supports RACH-less operation. This may mean shortened HO execution times.
 Make-before-break (mbb) HO: UE maintains the connection to the source cell after receiving the HO command. UE selects appropriate time (depending on the radio conditions) when to move to the target cell.
 RACH-less and mbb HO can be combined.

Same type of HO procedures may be specified also for NR but aiming to even shorter connection breaks during the HO.

Figure 2:
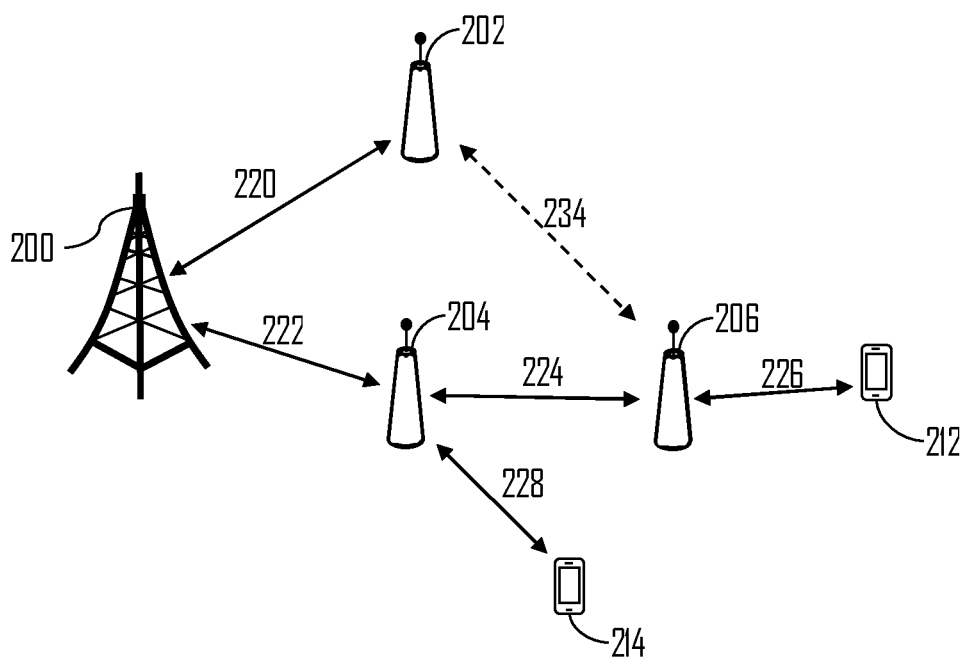
FIG. 2 illustrates an example a wireless communication system to which embodiments of the invention may be applied.

FIG. 2 shows an example of a multi-hop relay node deployment scenario in which the invented method can be applied. The donor IAB node 200 (e.g. base station, access node or network node/element) may have one or more relay nodes 202, 204 connected and active wireless BH connections 220 and 222 therebetween. The donor node 200 may be connected to core network via wired connection. The relay node 204 may further be serving a next hop BH link to the relay node 206 (see connection 224). It should be noted that each of the relay nodes may serve their own cell and the access UEs connected to those. In FIG. 2 two UEs are illustrated, one for relay node 204 (UE 214) and another for relay node 226 (UE 212). However, there may more than the illustrated UEs 212, 214 in the described system.

So, the relay node 206 is behind a two-hop wireless BH links. The BH connection 224 is the established link (i.e. to relay node 204) and the link (see reference number 234) to the relay node 202 can be considered as a candidate connection in case the link to relay node 204 is lost or degraded so that the BH connection 224 does not provide sufficient connection quality or capacity. Link 234 may not be active.

As discussed above, one example of a relay node is the so called IAB node. The IAB node may be comprised of a terminal function and either full gNB or DU functionality, the latter in case CU/DU split between the donor (e.g. node 200) and the IAB node (e.g. 202, 204, 206). The terminal part, mobile termination (MT), operates towards the serving node the same way as a normal UE; synchronizing to downlink signals, accessing the serving cell, establishing radio connection and carrying out required measurements and reporting for Radio Resource Management (RRM) purposes. The established connection to the serving node conveys the BH link data to the gNB or DU part of the IAB node. If CU/DU split is utilized, the CU part may be located at the donor node 200, for example. However, in some architectures both the DU and CU are located at the relay node, or IAB node.

So, as explained, in some architectures the DU and CU of a relay node, such as IAB node, may be located at the same physical entity which may be the relay node. Such architecture may be referred to as L3 architecture in some example embodiments. In case the DU and CU are split, and for example, the CU of a relay node (e.g. 202, 204, 206) is located at the donor node 200, the architecture may be referred to as L2 architecture The IAB node "mobility", i.e. how they adapt the topology, can utilize existing UE mobility principles. The IAB nodes can monitor neighboring cells/network nodes and a suitable event can trigger the change of the BH link to another serving node. A typical HO procedure can be used to execute the link change by sending a measurement report by the IAB MT, sending a HO command by the serving node (can also be referred to as source node), IAB node accessing the target node and sending a HO complete message in the target cell.

Currently, the BH switch of an IAB node has at least following general and IAB specific issues:

1. How to minimize the break of the radio connection when switching from source to target cell.
   What kind of preparation shall be done in the target node to enable fast access and connection establishment.
2. How to reduce/minimize the data interruption during the HO
   How and when to start forwarding data to the target node, and
   Data path switching or duplication over the BH connections.
3. How to increase/maximize spectrum efficiency by minimizing the overhead and multiple transmission of the same data over the BH links.

4. How to utilize mobility enhancements with IAB node mobility
   Conditional HO,
   Make before break,
   RACH-less HO, and
   Dual connectivity.

The proposed solution may address issues related to points 2 and 4 while applying a normal mobility procedure or some of the enhanced ones listed in 4.

Figure 3:
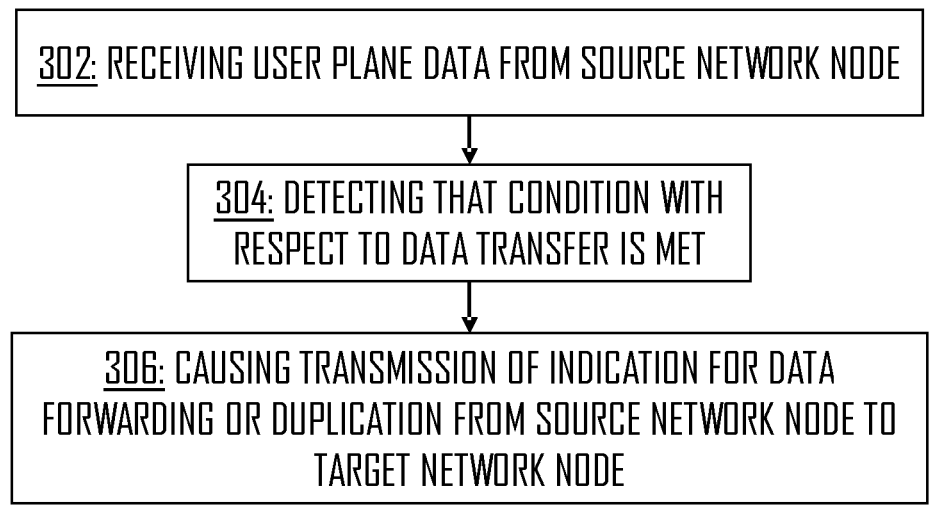
FIGS. 3, 4, and 5 illustrate example embodiments.
Figure 4:
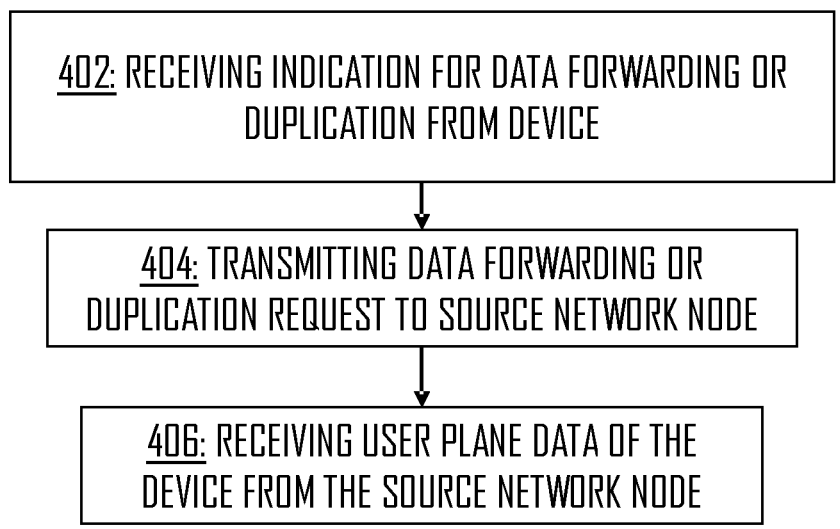
Figure 5:
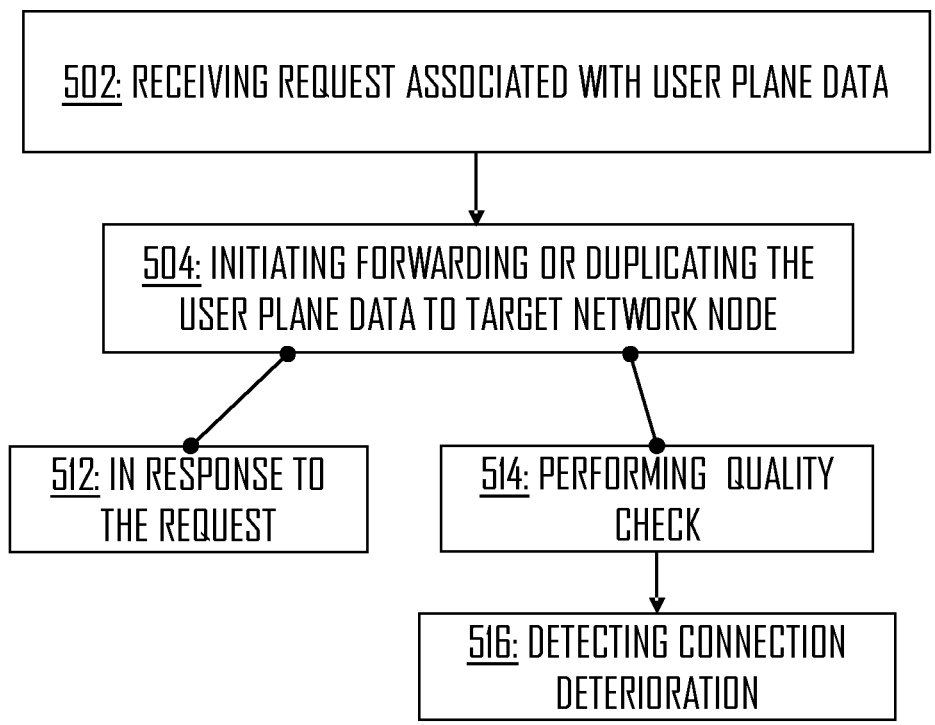

FIGS. 3, 4, and 5 illustrate flow diagrams according to some embodiments.

Referring to FIG. 3, a method in a device of a cellular network is illustrated, the method comprising: receiving (block 302) a user plane data from a source network node of the cellular network; detecting (block 304) that at least one quality condition with respect to the user plane data transfer is met; and in response to the detecting that the at least one quality condition is met, causing a transmission (block 306) of an indication for a data forwarding or duplication to a target network node of the cellular network or to the source network node, the data forwarding or duplication causing the source network node to forward or duplicate a user plane data of the device to the target network node.

Referring to FIG. 4, a method in a target network node of a cellular network is shown, the method comprising: receiving (block 402) an indication for a data forwarding or duplication request from a device of the cellular network, the request associated with a user plane data; transmitting (block 404), based on the received indication, the data forwarding or duplication request to a source network node of the cellular network; and receiving (block 406), from the source network node, user plane data of the device in response to transmitting the data forwarding or duplication request.

Referring to FIG. 5, a method in a source network node of a cellular network is shown, the method comprising: receiving (block 502) a request associated with a user plane data of a device of the cellular network; and initiating (block 504), based at least on the request, forwarding or duplicating the user plane data to a target network node of the cellular network, wherein the forwarding or duplicating is initiated in response to receiving the request (block 512) or in response to detecting (block 516, e.g. based on performing quality check in block 514)), by the source network node, that a connection between the device and the source network node deteriorates or has deteriorated.

In an example embodiment, the device discussed with respect to FIGS. 3 to 5 may be a relay node, such as relay node 206 in the example of FIG. 2. In such case, the target network node may be the relay node 202 and the source network node the relay node 204. With split RAN architecture, the source node may comprise a CU (centralized unit) at the donor node 200 and a DU (distributed unit) at the relay node 204. Source network node may be referred to as source node and target network node as target node. In this case the connection 224 may be used to transmit data between the relay node 206 and the relay node 204. However, the relay node 204 may forward or duplicate data to relay node 202 based on indication from the relay node 206 or based on request from the relay node 202. If the relay node 204 and relay node 202 comprise both the CU and DU parts, the forwarding or duplicating may happen such that the relay node 204 transmits directly the data to the relay node 202. If CU and DU split is utilized, the CUs of the nodes 202, 204 may be situated in another network element, such as at the network element 200 (or donor node 200). In this case the data may be transmitted physically between the CUs of the nodes 202, 204, but logically between the relay nodes 202, 204. It is also noted that the system may comprise more donor nodes, relay nodes and/or access UEs (i.e. 212, 214) than illustrated in FIG. 2. The system of FIG. 2 may be referred to as multi-hop relay node system (e.g. multi-hop IAB system).

In an example embodiment, the device discussed with respect to FIGS. 3 to 5 is an access UE, such as UE 212 or UE 214. For example, in such case the target node may be relay node 202 and source node 206 in the example of FIG. 2. In another example, the source node may be node 204 and target node may be relay node 206 or relay node 202.

In an example embodiment, the source node is the donor node 200. For example, the target node may then be another donor node or a relay node of another donor node. In this example, the device may be, for example, an access UE or a relay node.

In an example embodiment, the target node is the donor node 200. For example, the source node may then be another donor node or a relay node of another donor node. In this example, the device may be, for example, an access UE or a relay node.

In another example, the source node and/or target node may be gNB and/or a relay node. Again, the device may be, for example, an access UE or a relay node. So, the source node may be a gNB and the target node may be a gNB; the source node may be a gNB and the target node may be a relay node; the source node may be a relay node and the target node may be a gNB; or the source node may be a relay node and the target node may be a relay node. The gNB (i.e. one or more) may be connected to core network of the cellular network via wired connection, whereas the relay node may be connected to another relay node or, for example, gNB (or some other node) via wireless backhaul connection.

FIGS. 6A, 6B, 6C, and 6D illustrate some embodiments. Referring first to signal diagram of FIGS. 6A and 6B, data transfer between a device 600 and a source network node 610 is shown in block 622. The device 600 may be or be comprised in the device discussed above with reference to FIGS. 3 to 5, so e.g. access UE or relay node. Similarly, the source network node 610 may refer to the source network node discussed above with reference to FIGS. 3 to 5. The data transfer may refer to regular data transmission (e.g. voice, Internet data, text messages etc.) used in cellular networks, and may comprise at least user plane data of the device 600. The user plane data of the device 600 may refer to data that is targeted to the device 600 and/or data that is targeted to device or devices served by the device 600. So, for example, if the device 600 is or is comprised in relay node 206 of FIG. 2, the data may comprise data targeted to the relay node 206 and/or to the access UE 212. In another example, if the device 600 is or is comprised in relay node 204 of FIG. 2, the data may comprise data targeted to the relay node 204, to the relay node 206, to the access UE 212 and/or to the access UE 214.

In block 624, the device 600 may detect that a condition with respect to the data transfer with the source network node 610 is met. Block 624 may be similar as block 304. Therefore, the device 600 may transmit an indication in response to the detection of block 624, as shown in blocks 626 and 636.

Figure 6A:
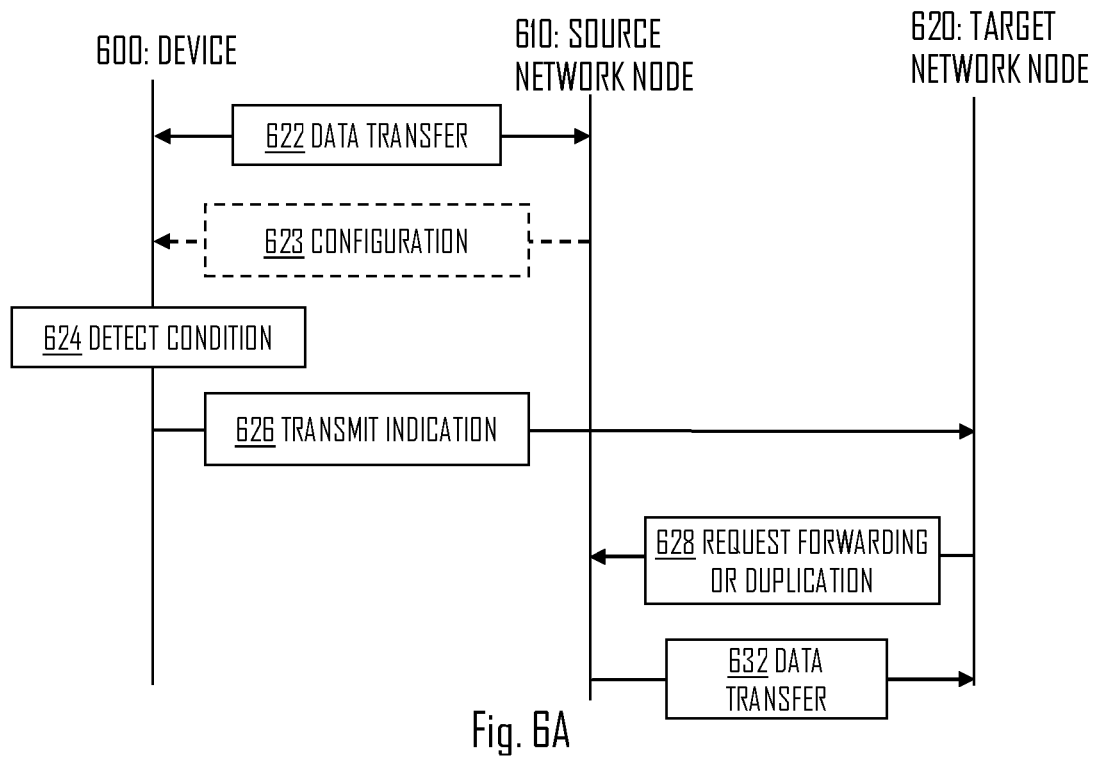
FIGS. 6A, 6B, 6C, and 6D illustrate some embodiments.

In the example embodiment of FIG. 6A, the indication is transmitted to the target network node 620 (block 626).

Figure 6B:
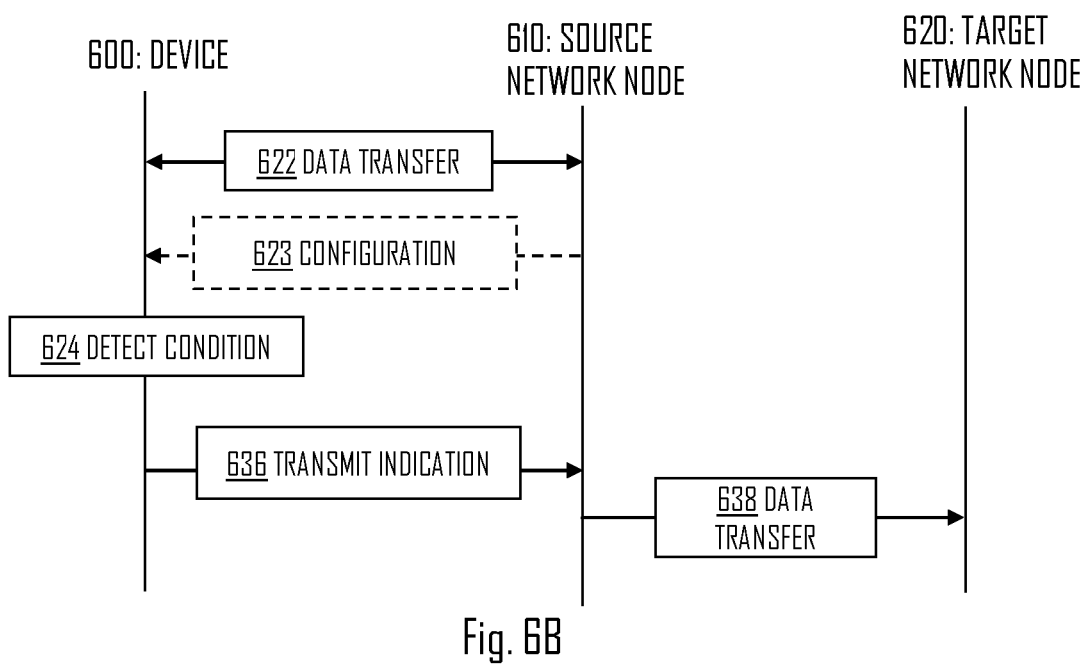

In the example embodiment of FIG. 6B, the indication is transmitted to the source network node 610 (block 636).

Referring to FIG. 6A, the indication is transmitted, by the device 600, to the target network node 620 in block 626. The indication may cause the target network node to transmit a data forwarding or duplication request to the source network node 610 as shown in block 628. In an embodiment, the request of block 628 is transmitted in response to receiving the indication of block 626.

Based at least on the request of block 628, the source network node 610 may start data forwarding or duplication. This may comprise transferring data to the target network node 620 (block 632). Particularly, the data transferred in block 632 may be the user plane data of device 600.

Referring to FIG. 6B, the indication is transmitted, by the device 600, to the source network node 610 in block 636. Based at least on the request of block 636, the source network node 610 may start data forwarding or duplication. This may comprise transferring data to the target network node 620 (block 638). Particularly, the data transferred in block 638 may be the user plane data of device 600.

The indication of block 626 or 636 may be referred to as indication for data forwarding or duplication. It may be understood as a request which is transmitted, for example, to the target node or to the source node, wherein the device 600 indicates and/or requests that its data is prepared for connection change and/or connection failure. In a way, the process may be understood as a backup data procedure. Let us consider scenario shown in FIG. 2, and let us assume that link 224 deteriorates such that data transfer between nodes 204, 206 is not possible or does not provide sufficient data throughput. The node may establish link 234 with the node 202 and receive data. However, if there is no pre-forwarding or pre-duplication of data, it takes time before the link 234 provides data to the node 206. Therefore, there may be a significant delay in service. Further, the data that is already transmitted via link 222 to the node 204 may need to be transmitted back to node 200 and further to node 202 before it may be transmitted to the node 206. As links 222, 220 may be wireless links (e.g. wireless backhaul), the cost (i.e. used radio resources) of data transfer may become very high. However, if the proposed solution is utilized, in which the data may be transferred to possible target node (e.g. node 202) (see blocks 632, 638), the target node 620 may provide the data faster to the device (e.g. 206) in case of link 224 deterioration.

In an embodiment, indication of block 636 comprises indication of the target node 620. For example, the device 600 may perform cell measurements and detect that node 620 is a suitable target node candidate. Hence, it may indicate this node to the source node so that the source node may determine to which node the user plane data should be forwarded or duplicated. If the target node 620 transmits the request (e.g. block 628), the source node 610 may determine the target for the data forwarding or duplication based on request (i.e. transmitter of the request may be target node 620).

Figure 6C:
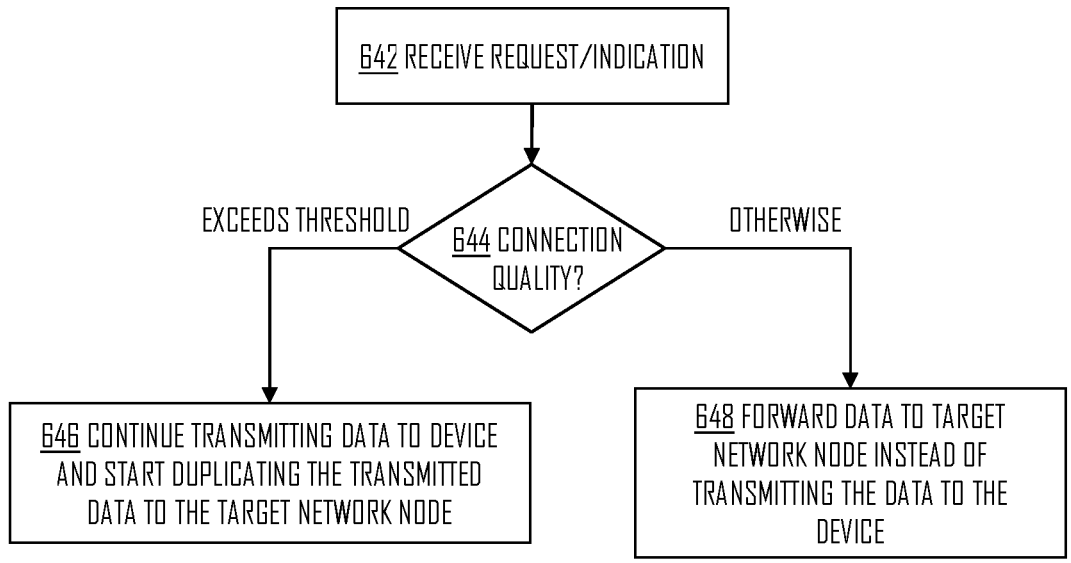

Referring to FIG. 6C, the source network node may receive the request or indication in block 642 for data forwarding or duplication. Now, the device transmitting the indication or request may not necessarily known whether it requests data forwarding or duplication. Instead, the source network node 610 may determine whether to forward or duplicate the data.

In an embodiment, if a quality of the connection to the device 600 exceeds a threshold, the source network node 610 duplicates the user plane data by transmitting the user plane data to the device 600 and to the target network node 620 (block 646).

In an embodiment, the quality of the connection to the device 600 does not exceed the threshold, the source network node 610 may forward the user plane data to the target network node 620 without transmitting the user plane data to the device 600 (block 648).

That is, in block 644 the source node 610 may determine whether or not the connection quality between the device 600 and the node 610 exceeds a threshold, and start duplication if it exceeds and otherwise forwarding. So, if the connection has deteriorated or deteriorates, the source network node 610 may start the forwarding. In such case the device 600 may need to establish a new connection with the target node 620 or possibly re-established connection with the source node 610 if the re-established connection exceeds the quality threshold, for example. However, if duplication is performed, the source node 610 may continue to serve device 600 normally, but also prepares for link deterioration (e.g. which may lead to handover) by transmitting the data also to the target node 620.

According to an embodiment, the forwarding or duplicating, by the source node 610, is initiated in response to detecting that the connection between the device 600 and the source network node 610 deteriorates. The source node 610 may further be configured to perform a quality check (see block 514) on the connection after receiving the request (e.g. block 502, 626, 635, 642), wherein the detecting whether or not the connection deteriorates is based on the quality check (block 516).

The indication transmitted in block 306, block 626, and/or block 636 may be non-contentious Physical Random Access Channel (PRACH) sent on configured dedicated resources, contentious PRACH sent on common access resources, Sounding Reference Signal (SRS) sent on configured dedicated resources, included in one or more other messages of access procedure (e.g. msg 3 or msg 5 of random access procedure), and/or some other signalling option.

The condition that triggers the transmission of the indication (see e.g. block 304) may be a certain pre-defined (e.g. preconfigured or configured by the network) condition or conditions. For example, the condition may be a quality condition, e.g. quality of the connection between the device 600 and node 610 exceeds a certain threshold or is below a certain threshold, and thus the device 600 transmits the indication. One specific example of such quality threshold is data throughput. So, if data throughput, calculated/determined/obtained by the device 600, equals or is below a certain threshold, the indication transmission may be triggered. The condition (e.g. threshold) may be set such that the connection towards the source node 610 is still operational so that the data forwarding or duplication is beneficial, and possibly so that the indication can be transmitted to the source node 610. The condition may be similar to the triggers of handover or conditional handover triggers. In one example, the condition is such that it is a quality condition between triggering conditions of event 1 and event 2 of the CHO process. So, if event 1 triggers transmission of early handover command and event 2 triggers actual handover execution, the data forwarding or duplication may be configured to be triggered between events 1 and 2.

As noted, the trigger for transmitting the indication may be preconfigured or configured by the network, such as by the source node 610. Configuration by the source node 610 is shown in FIGS. 6A and 6B with block 623. So, in an embodiment, the source node 610 transmits a configuration message to the device 600, wherein the configuration message indicates at least one quality condition with respect to user plane data transfer between the source node 610 and the device 600. The device 600 may receive the configuration message from the source node 610, wherein the configuration message indicates the at least one quality condition. The configuration message may cause the device 600 to transmit the indication for the data forwarding or duplication to the target node 620 (e.g. block 626) or to the source node 610 (e.g. block 636) in response to detecting that the at least one predetermined quality condition with respect to the user plane data transfer is met. In one example embodiment, the trigger or condition for transmitting the indication is indicated in a handover command. One example of this is early handover command or conditional handover command. So, the source node 610 may transmit the handover command to the device 600, wherein the handover command comprises/indicates the condition used in block 304, for example. The handover command may additionally comprise the event 2 condition. So, the CHO command may be use to indicate both the data forwarding or duplication condition and the handover execution condition.

In the option that the indication is sent to the target node 620, which is for example CU at the donor node 200 or a relay node that comprises also the CU part, the target node 620 may request the data forwarding or duplication from the source node 610 (e.g. block 628). This request may be transmitted utilizing an Xn interface between the nodes 610, 620. For example, the request may be an existing Xn message or a new Xn message. Said Xn message may comprise or indicate the request to the source node 610.

So, after receiving the indication or request in block 642, the source node 610 may continue the process with at least two different options: forwarding or duplicating the user plane data. For example, if the source BH connection is still running, the source node 610 may start data duplication (block 646):

- The data connection over the BH link to the source cell (provided by the source node 610) may continue but the data duplication is preparing the uplink path switch to the target node 620.
- The duplication can be for the Packet Data Convergence Protocol (PDCP) Protocol Data Units (PDUs), or, the duplication can be done on the lower layers, e.g. on Radio Link Control (RLC) layer or on the adaptation layer defined for L2 relaying;
- Uplink data may still utilize the old link to the source node 610;
- Source node 610 may send a HO command (e.g. if not early HO command sent), the procedure can be same/similar to that of CHO case.
- Both radio connection may change as well as the uplink path may be prepared for a consequent BH links change to make the switch fast as possible.

For example, if the source BH connection is lost (or is at least estimated to be lost in the future), the source node 610 may start to forward data (block 648) to the target node 620 (e.g. the node which requested the forwarding or duplication or node which is indicated in an indication transmitted by the device 600):

- Device 600 that is changing the BH link proceeds with access procedure to the target cell (i.e. provided by the target node 620) and eventually sends a HO complete-message, or a connection re-establishment request, connection resume request, of corresponding message in case of a failure in the source connection;
- Uplink data is started to be sent and routed via the target cell.
- The procedure may be similar to the CHO and may be a back-up procedure for any failures encountered in the source cell.

Figure 6D:
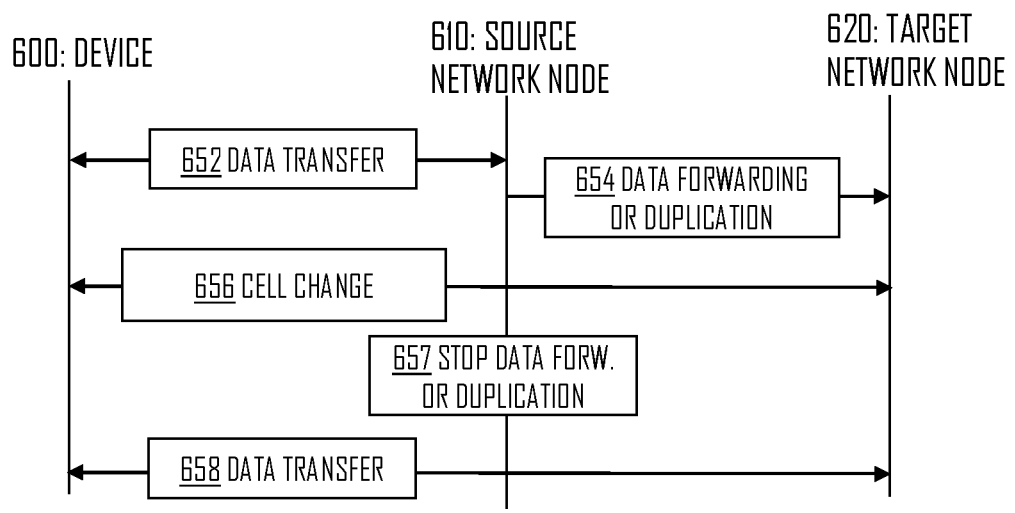

Referring now to FIG. 6D, in block 652 the device and the source node may transmit data therebetween. In block 654, the source node may forward or duplicate data of the device 600 to the target network node 620. This may be performed on the basis of or in response to receiving the request from the device 600 or from the node 620 as explained above.

In block 656, the device 600 may establish a connection with the target node 620 in response to detecting a predetermined event; and receive the user plane data via the connection with the target node 620 (block 658). The predetermined event may be, for example, the event 2 of CHO procedure which may trigger the handover execution.

Similarly, in block 656, the target node 620 may establish a connection with the device 600 based on a request from the device; and transmit the user plane data to the device via the established connection (block 658).

Basically, the device 600 may change cell from source node 610 provided cell to target node 620 provided cell by performing a cell change (block 656). Data transfer of block 658 may be started earlier than in legacy systems as the source node 610 has transmitted the user plane data beforehand to the target node (i.e. in block 654).

It is noted that the forwarding or duplication may be performed until it is stopped, for example. That is, in an embodiment, the source node 610 stops transmitting (block 657) the user plane data to the target node 620 in response to detecting that at least one predetermined criterion is met. For example, the data forwarding or duplication may be ceased (i.e. meaning that the activity that is being performed is stopped, e.g. if data is forwarded it may be stopped and if data is duplicated it may be stopped) if:

Connection between the device 600 and the source node 610 recovers (e.g. serving BH link), and the quality of the connection exceeds a threshold (e.g. is good enough for transmitting data or good enough for certain data throughput). It is possible to utilize another threshold to detect such situation.

Target cell quality degraders below a given threshold.

Timeout, there could be a timer how long the data forwarding or duplication may last if the HO execution is not triggered. This eliminates unnecessary load on the BH connections. So, if HO is not triggered from source to target cell within a certain time period, the forwarding or duplication may be stopped.

It either serving or target cell decides so, the decision may be up to decisions based on information available only in the serving/target or donor nodes, it may be also up to node/RAN implementation.

The data forwarding may be ceased by a message between the source and target nodes 610, 620, for example. So, if the target node 620 determines that the forwarding or duplication should end, it may send an explicit message to the source node 610. The message may be an Xn or F1 message, for example. In another example embodiment, another indication (similar to the indication of block 626 or 636) may be used. So, the device 600 may request the source node 610 to stop the forwarding or duplication. This may be performed, for example, in the case that the target cell quality (e.g. measured by the device 600) degrades below a given or predetermined threshold. It is also possible that the target node 620 detects the degradation and transmits the indication to stop the forwarding or duplication.

In an embodiment, the device 600 utilizes a wireless backhaul connection to the source node 610, and wherein the user plane data is received via the wireless backhaul connection. If the connection is changed to target node 620, the new connection may also utilize wireless backhaul connection (e.g. 5G connection).

In an embodiment, the device 600 comprises a relay node, wherein the device 600 is configured to transmit the user plane data to an access user equipment directly or via one or more another relay node.

In an embodiment, target and source network nodes 620, 610 each comprise a relay node having a wireless backhaul connection to a network node (e.g. node 200) of the cellular network.

Figure 7:
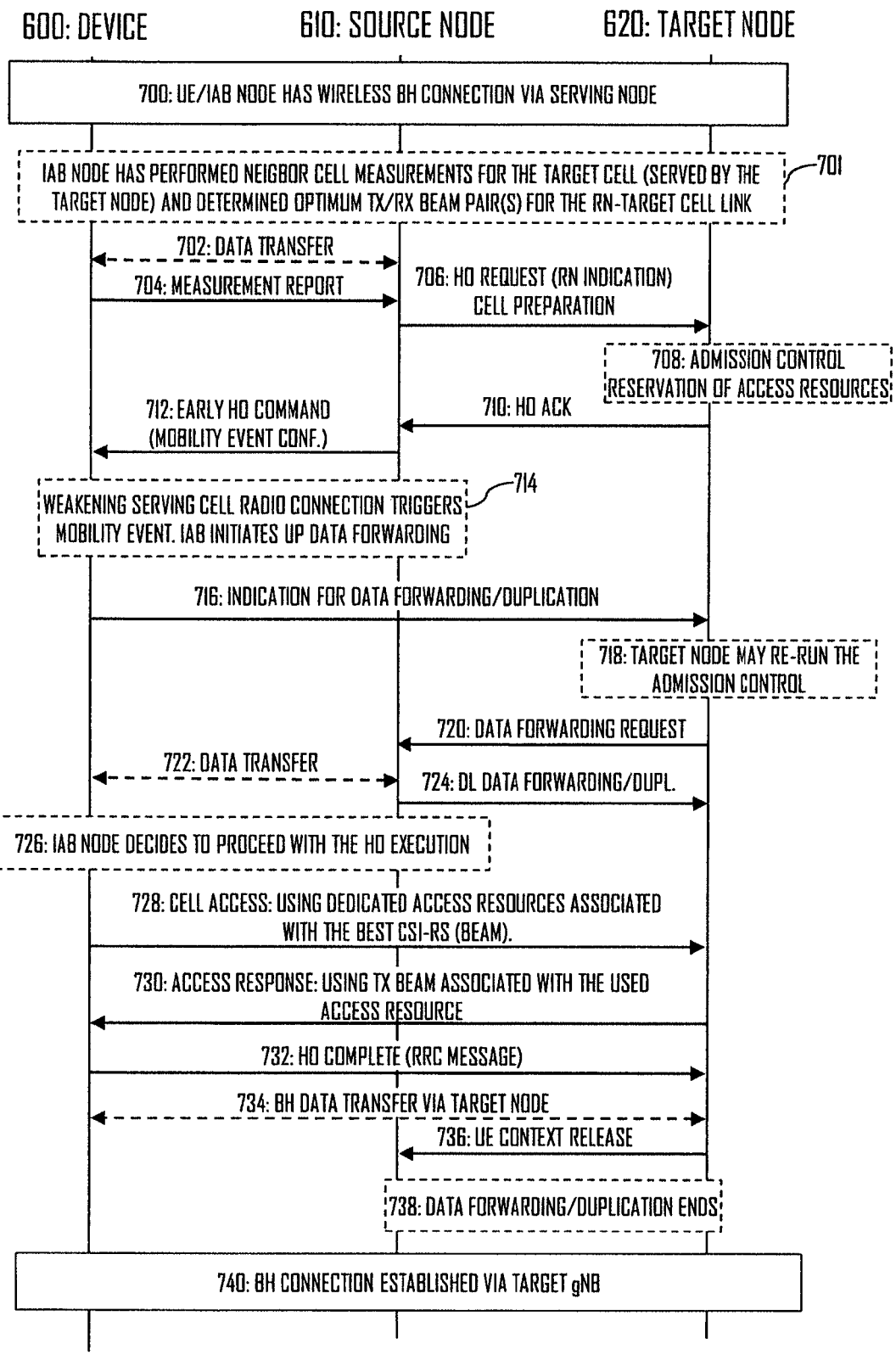
FIG. 7 illustrates an embodiment.

FIG. 7 illustrates a signalling diagram according to an example embodiment in which the proposed solution is applied in the CHO procedure. Referring to FIG. 7, in the initial state (block 700), the device 600 is connected to a source node (or can be referred to as serving node) and may have an active BH connection over that connection.

In block 701, it is noted that the device 600 (or more particularly the UE or MT part of the device) has carried out neighbour cell measurements and reported those to the source node 610. The measurements may have been enhanced in the way where the beam refinement (beam selection) has been carried out. The advanced measurements may have used Channel State Information Reference Signal (CSI-RS) signals to measure the radio conditions where the CSI-RS configuration has been configured/coordinated e.g. by the source node 610.

In 702, it is shown that data transmission of the BH link may be via the source node 610.

In 704, the device 600 may transmit measurement report as proposed by the CHO procedure.

In 706, the source node 610 may transmit HO request to target node.

In block 708, based on the HO request, the target node 620 may perform admission control, and acknowledge (or possibly non-acknowledge) the HO request in 710.

In 712, the source node 610 may transmit an early HO command or CHO command to the device 600. As noted above, in an embodiment, the early HO command further comprises the condition or trigger for transmitting the indication for data forwarding or duplication. In addition the command may comprise the CHO event 1 and 2 conditions or triggers.

So, as the serving cell weakens in block 714, the proposed solution may be utilized as described above. That is, the device 600 transmits the indication for data forwarding or duplication in 716 if the condition of 712 (or pre-configured condition) is met. In this example, the indication is transmitted to the target node 620, but as noted above it could be transmitted directly to the source node 610. So, the device 600 indicates that the data forwarding could be started due to weakening radio conditions on the serving cell.

If accepted, the target node 620 requests the source node 610 to initiate data forwarding or duplication (720). It is possible that the admission control is re-run based on the indication of 716 (block 718) before the request of 720.

So, data may be transmitted between the device and the source node (722) if the connection is still good enough for data transmission. In 724, the data may be forwarded or duplicated to target node 620.

In the example embodiment of FIG. 7, the conditional HO event is triggered (block 726) and the device 700 eventually initiates access procedure (728). Now, with the preceding indication, not only the access to the target cell is instant but also the data path is already prepared and running to the target node and the uplink path-switch causes minimum/no interruption of the BH data transmission. That applies for the downlink data transfer whereas potential interruption on the uplink data connection depends on the need for re-transmissions of the packets that has not been completely sent over the source link. The access procedure may comprise steps of 730 and 732. In 734, the data transmission may already be performed via the target node 620.

The source node 610 may stop (block 738) the data forwarding or duplication in response to receiving context release from the target node 620 (736). In block 740 it is shown that the new BH connection for the device 600 is established via the target node 620 which may be, for example, a gNB.

To summarize, to make the BH link change fast as possible by having the radio connection to the target cell immediately ready for data transmission as well as to overcome the problems with conventional HO signalling, following features can be considered in NR:

- Cell measurement results of the MT (mobile termination) part of the device 600 are made available for the gNB part or DU part (in case of CU/DU split architecture) of the device 600. Alternatively, the neighbour cell information is provided by the O&M system, using automatic neighbour relation (ANR) signalling, or otherwise signalled over the network interfaces: within RAN over Xn or by NGC over the NG-C (or S1 to 4G EPC);
- The source node can prepare the candidate target node(s) for anticipated handover (BH link change) by sending a HO request over the Xn interface or configuring access resources over the F1 (with CU/DU split);
- Selection of the prepared cells can be based on the cell measurements of the device 600, or based on information provided by the network signalling (see previous bullet);
- Target node accepting the HO request may provide necessary information to establish the connection to the new cell, including access parameters to initiate the connection (as per current specifications and anticipated NR principles), or the CU of the target node (i.e. in case of split architecture) is made aware of the reserved access resources by the DU of the target cell.
- Target cell information is made available to the MT part of the device 600 by RRC signalling of over the F1 (or corresponding interface) connection in case of CU/DU split between donor and the IAB node.

With such enhancements, the target cell may be ready to receive access (e.g. PRACH pre-ample or other access signals e.g. in case RACH-less operation) known here also by the IAB node (MT part). Not all features are mandatory and different combinations of the features can be possible. With the proposed enhanced features, the device 600 (or the UE part of the device 600 in case the device 600 is an relay node or IAB node) is able to change the BH link to (any of the) candidate target nodes just by initiating access using the provided access information.

Some advantages of the proposed solution may comprise:
- Reduced overhead and load due to data forwarding over the BH connections;
- Enables possibility for close to zero interruption of the data connection at the BH link change without dual connectivity;
- Means to optimally start/stop data forwarding when the radio conditions change on the source and target links; and/or
- Same preparation procedure for the BH link change applicable for both successful and failed HO; Optimal (near zero data interruption) BH change in case normal HO execution and fast failure recovery via the prepared target cell.

Most of the advantages listed above are available also in the scenarios involving only gNBs and UEs. I.e. most of the advantages may be achieved without using IAB nodes.

Figure 8:
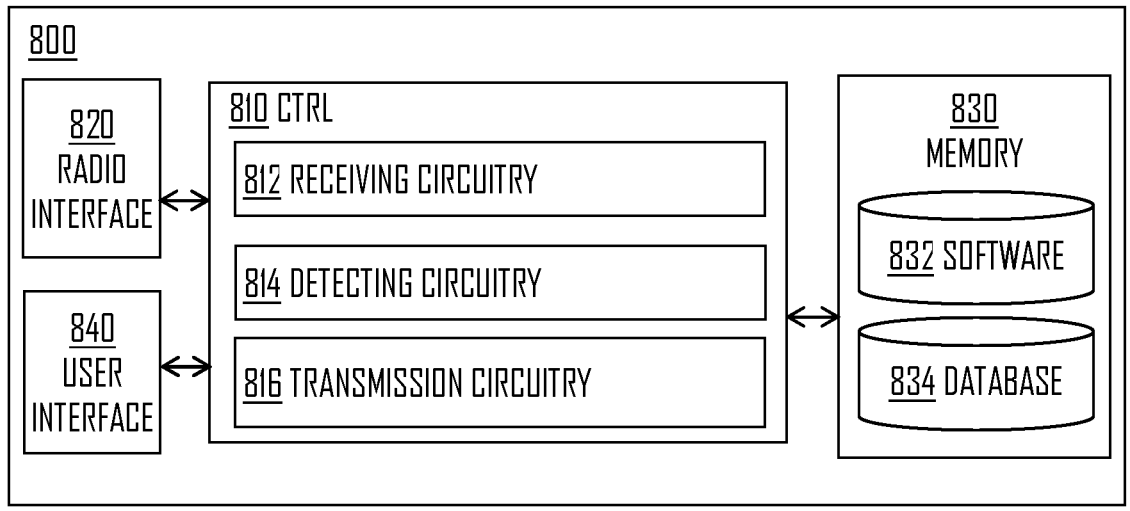
FIGS. 8, 9, and 10 illustrate block diagrams according to some embodiments.
Figure 9:
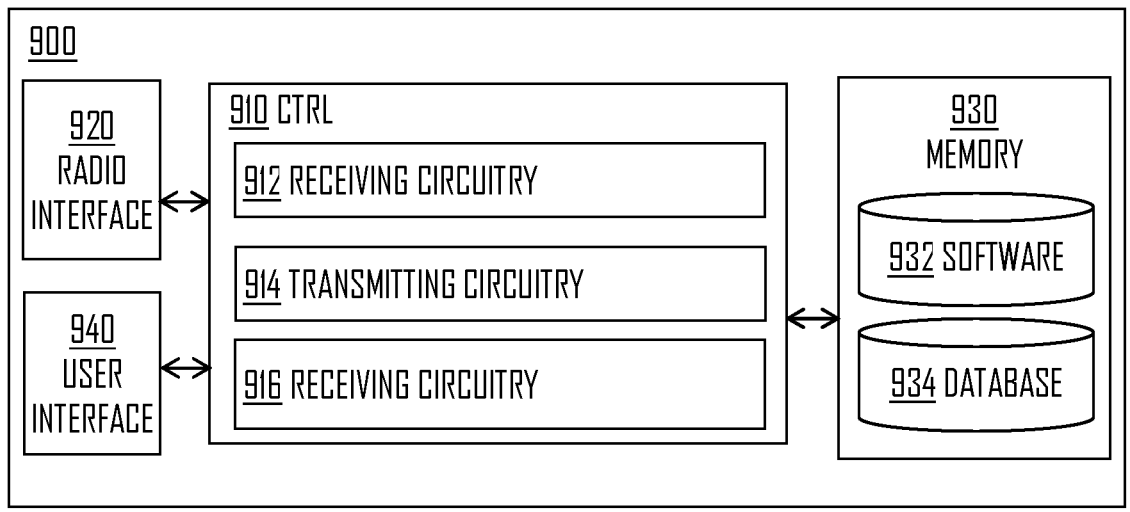
Figure 10:
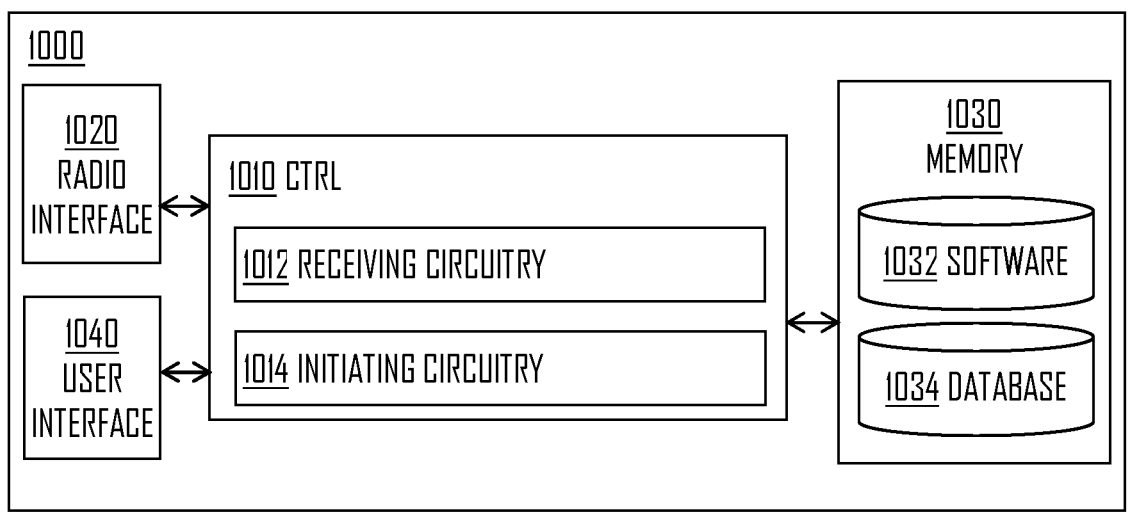

FIGS. 8, 9, and 10 provide apparatuses 800, 900, 1000 comprising a control circuitry (CTRL) 810, 910, 1010, such as at least one processor, and at least one memory 830, 930, 1030 including a computer program code (software) 832, 932, 1032, wherein the at least one memory and the computer program code (software) 832, 932, 1032, are configured, with the at least one processor, to cause the respective apparatus 800, 900, 1000 to carry out any one of the embodiments described above, such as with reference to FIGS. 1 to 7, or operations thereof.

Referring to FIGS. 8, 9, and 10, the memory 830, 930, 1030 may be implemented using any suitable data storage technology, such as semiconductor based memory devices, flash memory, magnetic memory devices and systems, optical memory devices and systems, fixed memory and removable memory. The memory 830, 930, 1030 may comprise a database 834, 934, 1034 for storing data.

The apparatus 800, 900, 1000 may further comprise radio interface (TRX) 820, 920, 1030 comprising hardware and/or software for realizing communication connectivity according to one or more communication protocols. The TRX may provide the apparatus with communication capabilities to access the radio access network and enable communication between network nodes, for example. The TRX may comprise standard well-known components such as an amplifier, filter, frequency-converter, (de)modulator, and encoder/decoder circuitries and one or more antennas. The TRX may provide, for example, connection to Xn interface and/or wireless backhaul connection.

The apparatus 800, 900, 1000 may also comprise user interface 840, 940, 1040 comprising, for example, at least one keypad, a microphone, a touch display, a display, a speaker, etc. The user interface 840, 940, 1040 may be used to control the respective apparatus by a user of the apparatus 800, 900, 1000.

In an embodiment, the apparatus 800 may be or be comprised in the device 600. The apparatus 800 may comprise an IAB node or at least DU of the IAB node. The CU of the IAB node may be comprised in the apparatus 800 or in some other apparatus of the cellular network, for example. The apparatus 800 may comprise MT part and/or gNB part.

According to an embodiment, the CTRL 810 comprises a receiving circuitry 812 configured at least to perform operations described with respect to block 302; a detecting circuitry 814 configured at least to perform operations described with respect to block 304; and a transmission circuitry 816 configured at least to perform operations described with respect to block 306.

In an embodiment, the apparatus 900 may be or be comprised in the target node 620. The apparatus 900 may comprise an IAB node or at least DU of the IAB node. The CU of the IAB node may be comprised in the apparatus 900 or in some other apparatus of the cellular network, for example. The apparatus 900 may comprise MT part and/or gNB part. In an embodiment, the apparatus 900 is or is comprised in a donor node (e.g. node 200 or similar node).

According to an embodiment, the CTRL 910 comprises a receiving circuitry 912 configured at least to perform operations described with respect to block 402; a transmitting circuitry 914 configured at least to perform operations described with respect to block 404; and a receiving circuitry 916 configured at least to perform operations described with respect to block 406.

In an embodiment, the apparatus 1000 may be or be comprised in the source node 610. The apparatus 1000 may comprise an IAB node or at least DU of the IAB node. The CU of the IAB node may be comprised in the apparatus 1000 or in some other apparatus of the cellular network, for example. The apparatus 1000 may comprise MT part and/or gNB part. In an embodiment, the apparatus 1000 is or is comprised in a donor node (e.g. node 200 or similar node).

According to an embodiment, the CTRL 1010 comprises a receiving circuitry 1012 configured at least to perform operations described with respect to block 502; and an initiating circuitry 1014 configured at least to perform operations described with respect to block 504. Further, the initiating circuitry 1014 may at least perform operations described with respect to blocks 512, 514, and/or 516.

In an embodiment, at least some of the functionalities of the apparatus 800, 900, 1000 may be shared between two physically separate devices, forming one operational entity. Therefore, the apparatus 800, 900, 1000 may be seen to depict the operational entity comprising one or more physically separate devices for executing at least some of the described processes. Thus, the apparatus 800, 900, 1000 utilizing such shared architecture, may comprise a remote control unit (RCU), such as a host computer or a server computer, operatively coupled (e.g. via a wireless or wired network) to a remote radio head (RRH), such as a Transmission Point (TRP), located in a base station or network node, for example. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Another example of split architecture may be the CU and DU split explained above. Hence, the apparatuses 800, 900, 1000 are intended to include also these split architectures in which the functionalities of the apparatuses 800, 900, 1000 are shared between more than one physical entity.

According to an embodiment, there is provided a system comprising the apparatuses 800, 900, and 1000. There may be one or more of each of said apparatuses 800, 900, 1000 in the system. In an embodiment, the system is referred to as a cellular system.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 7 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 7, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor; and
   at least one memory including computer program code, wherein the at least one memory and computer program code are configured, with the at least one processor, to cause a source network node of a cellular network at least to perform:
   receiving a request associated with a user plane data of a device of the cellular network; and
   initiating, based at least on the request, duplicating the user plane data to a target network node of the cellular network,
   wherein the duplicating is initiated in response to receiving the request or in response to detecting, by the source network node, that a connection between the device and the source network node deteriorates or has deteriorated,
   wherein the request comprises a data duplication request received from the target network node,
   wherein the request comprises an indication for data duplication received from the device,
   wherein the target and source network nodes each comprise a base station (gNB) having a wired connection to a core network of the cellular network, and
   wherein in response to a quality of the connection to the device exceeding a threshold, duplicating the user plane data by transmitting the user plane data to the device and to the target network node.

2. The apparatus of claim 1, wherein the target and source network nodes each comprise a relay node having a wireless backhaul connection to a network node of the cellular network.

3. The apparatus of claim 1, wherein the at least one memory and computer program code are further configured, with the at least one processor, to cause the source network node to perform:
   transmitting a configuration message to the device, wherein the configuration message indicates at least one quality condition with respect to user plane data transfer between the source network node and the device, and wherein the configuration message causes the device to transmit an indication for the data duplication to the target network node or to the source network node in response to detecting that the at least one quality condition with respect to the user plane data transfer is met.

4. The apparatus of claim 3, wherein the at least one memory and computer program code are further configured, with the at least one processor, to cause the source network node to perform:
   stopping transmitting the user plane data to the target network node in response to detecting that at least one predetermined criterion is met.

5. The apparatus of claim 4, wherein the duplicating is initiated in response to detecting that the connection between the device and the source network node deteriorates, and wherein the at least one memory and computer program code are further configured, with the at least one processor, to cause the source network node to perform:
   performing a quality check on the connection after receiving the request, wherein the detecting whether or not the connection deteriorates is based on the quality check.

6. A method performed by a source network node of a cellular network comprises:
   receiving a request associated with a user plane data of a device of the cellular network; and
   initiating, based at least on the request, duplicating the user plane data to a target network node of the cellular network,
   wherein the duplicating is initiated in response to receiving the request or in response to detecting, by the source network node, that a connection between the device and the source network node deteriorates or has deteriorated,
   wherein the request comprises a data duplication request received from the target network node,
   wherein the request comprises an indication for data duplication received from the device,
   wherein the target and source network nodes each comprise a base station (gNB) having a wired connection to a core network of the cellular network,
   wherein in response to a quality of the connection to the device exceeding a threshold, duplicating the user plane data by transmitting the user plane data to the device and to the target network node.

7. The method of claim 6, wherein the target and source network nodes each comprise a relay node having a wireless backhaul connection to a network node of the cellular network.

8. The method of claim 6, further comprising:
   the source network node transmitting a configuration message to the device, wherein the configuration message indicates at least one quality condition with respect to user plane data transfer between the source network node and the device, and wherein the configuration message causes the device to transmit an indication for the data duplication to the target network node or to the source network node in response to detecting that the at least one quality condition with respect to the user plane data transfer is met.

9. The method of claim 8, further comprising:
stopping transmitting the user plane data to the target network node in response to detecting that at least one predetermined criterion is met.

10. The method of claim 9, further comprising:
performing a quality check on the connection after receiving the request, wherein the detecting whether or not the connection deteriorates is based on the quality check.

* * * * *